(12) United States Patent
Islam et al.

(10) Patent No.: US 10,635,491 B2
(45) Date of Patent: Apr. 28, 2020

(54) SYSTEM AND METHOD FOR USE OF A MULTI-TENANT APPLICATION SERVER WITH A MULTITASKING VIRTUAL MACHINE

(71) Applicant: ORACLE INTERNATIONAL CORPORATION, Redwood Shores, CA (US)

(72) Inventors: Nazrul Islam, Santa Clara, CA (US); Rajiv Mordani, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 134 days.

(21) Appl. No.: 15/146,312

(22) Filed: May 4, 2016

(65) Prior Publication Data

US 2016/0328268 A1 Nov. 10, 2016

Related U.S. Application Data

(60) Provisional application No. 62/157,387, filed on May 5, 2015.

(51) Int. Cl.
*G06F 9/50* (2006.01)
*G06F 9/455* (2018.01)

(52) U.S. Cl.
CPC ............ *G06F 9/50* (2013.01); *G06F 9/45504* (2013.01); *G06F 9/5077* (2013.01)

(58) Field of Classification Search
CPC ................................ G06F 9/50; G06F 9/45504
See application file for complete search history.

(56) References Cited

U.S. PATENT DOCUMENTS

| 6,931,638 B2 | 8/2005 | Daynès et al. |
| 7,003,768 B2 | 2/2006 | Daynès et al. |

(Continued)

FOREIGN PATENT DOCUMENTS

| CN | 101639835 | 2/2010 |
| CN | 102170457 | 8/2011 |

(Continued)

OTHER PUBLICATIONS

"Multitasking without Compromise: a Virtual Machine Evolution", by Grzegorz Czajkowski and Laurent Daynès of Sun Microsystems, OOPSLA 01 Tampa Florida USA, Copyright ACM 2001 (14 pages).

(Continued)

*Primary Examiner* — Sisley N Kim
(74) *Attorney, Agent, or Firm* — Tucker Ellis LLP

(57) ABSTRACT

In accordance with an embodiment, described herein is a system and method for use of a multi-tenant application server with a multitasking virtual machine. The multi-tenant application server enables the definition of one or more partitions that provide a runtime and administrative subdivision or slice of an application server domain; while the multitasking virtual machine enables safe, secure, and scalable multitasking of software applications. Applications can be deployed a resource group scoped either to a domain or to a particular partition, or to a resource group template at the domain level. Partitions running on a managed server instance within the domain can share the multitasking virtual machine, which provides each partition with its own subdivision or slice of that multitasking virtual machine.

21 Claims, 10 Drawing Sheets

(56) References Cited

U.S. PATENT DOCUMENTS

| | | | |
|---|---|---|---|
| 7,065,755 | B2 | 6/2006 | Daynès et al. |
| 7,165,255 | B2 | 1/2007 | Czajkowski et al. |
| 7,454,448 | B1 | 11/2008 | Daynès et al. |
| 7,584,231 | B1 | 9/2009 | Daynes et al. |
| 7,627,621 | B2 | 12/2009 | Daynès et al. |
| 7,756,912 | B2 | 7/2010 | Daynès et al. |
| 7,870,171 | B2 | 1/2011 | Daynès et al. |
| 8,250,559 | B2 | 8/2012 | Daynès et al. |
| 8,326,876 | B1 | 12/2012 | Venkataraman et al. |
| 8,490,070 | B2 | 7/2013 | Diez et al. |
| 2007/0245331 | A1* | 10/2007 | Daynes ............... G06F 9/44521 717/166 |
| 2010/0031270 | A1 | 2/2010 | Wu et al. |
| 2010/0050174 | A1 | 2/2010 | Zhou et al. |
| 2012/0072597 | A1 | 3/2012 | Teather et al. |
| 2012/0254266 | A1 | 10/2012 | Printezis et al. |
| 2013/0179880 | A1* | 7/2013 | Edholm ............... G06F 9/45558 718/1 |
| 2014/0075021 | A1* | 3/2014 | Revanuru ............... H04L 43/04 709/224 |
| 2015/0207758 | A1 | 7/2015 | Mordani et al. |

FOREIGN PATENT DOCUMENTS

| | | |
|---|---|---|
| CN | 102333115 | 1/2012 |
| CN | 102571821 | 7/2012 |
| CN | 102571916 | 7/2012 |
| CN | 102609271 | 7/2012 |
| CN | 102932404 | 2/2013 |
| CN | 102932405 | 2/2013 |
| CN | 103455512 | 12/2013 |
| JP | 5646591 | 12/2014 |
| KR | 100695218 | 3/2007 |

OTHER PUBLICATIONS

Chinese Patent Office, Office Action dated Jul. 20, 2018, 8 pages.

Czajkowski, Grzegorz; "Application Isolation in the Java Virtual Machine", OOPSLA '00 Proceedings of the 15th ACM SIGPLAN conference on Object-oriented programming, systems, languages, and applications; ACM SIGPLAN Notices Homepage; vol. 35 Issue 10, Oct. 2000; pp. 354-366 (13 pages).

Czajkowski, et al., "The Design of MVM—a Multitasking Virtual Machine", Sun Microsystems Laboratories, filed as U.S. Appl. No. 60/276,409 on Mar. 15, 2001, 19 pages.

European Patent Office, Communication pursuant to Article 94(3) EPC, for European Patent Application No. 15704133.6, dated Apr. 23, 2019, 4 pages.

Heiss, Janice; "The Multi-Tasking Virtual Machine: Building a Highly Scalable JVM", Oracle Technology Network, published Mar. 22, 2015, retrieved on Apr. 3, 2015 from http://www.oracle.com/technetwork/articles/java/mvm-141094.html, 3 pages.

U.S. Appl. No. 60/276,409, filed Mar. 15, 2001, 20 pages.

United States Patent and Trademark Office, Notice of Allowance for U.S. Appl. No. 15/948,721, dated Aug. 9, 2019, 18 pages.

* cited by examiner

SYSTEM AND METHOD FOR USE OF A MULTI-TENANT APPLICATION SERVER WITH A MULTITASKING VIRTUAL MACHINE

CLAIM OF PRIORITY AND CROSS-REFERENCE TO RELATED APPLICATIONS

This application claims the benefit of priority to U.S. Provisional Patent Application titled "SYSTEM AND METHOD FOR USE OF A MULTITENANT APPLICATION SERVER ENVIRONMENT WITH A MULTITASKING VIRTUAL MACHINE", Application No. 62/157,387, filed May 5, 2015; and is related to U.S. patent application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015, which claims the benefit of priority to U.S. Provisional Application No. 61/929,888, filed Jan. 21, 2014, and 62/015,966, filed Jun. 23, 2014; U.S. Pat. Nos. 8,250,559, 7,065,755, 6,931,638, 7,870,171, 7,003,768, 7,165,255, 7,627,621, 7,454,448, and 7,756,912; and U.S. Patent Publication No. 20120254266; each of which above applications and patents are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud-based computing environments, and are particularly related to a system and method for use of a multi-tenant application server environment with a multitasking virtual machine.

BACKGROUND

Application servers, for example software products such as Oracle WebLogic Server, when executed on a computer, provide a managed environment for developing and running enterprise software applications. A multi-tenant cloud-based computing environment allows tenants to develop and run their own software applications that can take advantage of application server or other resources provided by that computing environment. These are some examples of the types of environments in which embodiments of the present invention can be used.

SUMMARY

In accordance with an embodiment, described herein is a system and method for use of a multi-tenant application server with a multitasking virtual machine. The multi-tenant application server enables the definition of one or more partitions that provide a runtime and administrative subdivision or slice of an application server domain; while the multitasking virtual machine enables safe, secure, and scalable multitasking of software applications. Applications can be deployed a resource group scoped either to a domain or to a particular partition, or to a resource group template at the domain level. Partitions running on a managed server instance within the domain can share the multitasking virtual machine, which provides each partition with its own subdivision or slice of that multitasking virtual machine.

DETAILED DESCRIPTION

As described above, application servers, for example software products such as Oracle WebLogic Server, when executed on a computer, provide a managed environment for developing and running enterprise software applications. A multi-tenant cloud-based computing environment allows tenants to develop and run their own software applications that can take advantage of application server or other resources provided by that computing environment.

In accordance with an embodiment, described herein is a system and method for use of a multi-tenant application server with a multitasking virtual machine. The multi-tenant application server enables the definition of one or more partitions that provide a runtime and administrative subdivision or slice of an application server domain; while the multitasking virtual machine enables safe, secure, and scalable multitasking of software applications. Applications can be deployed a resource group scoped either to a domain or to a particular partition, or to a resource group template at the domain level. Partitions running on a managed server instance within the domain can share the multitasking virtual machine, which provides each partition with its own subdivision or slice of that multitasking virtual machine.

Application Servers

Figure 1:
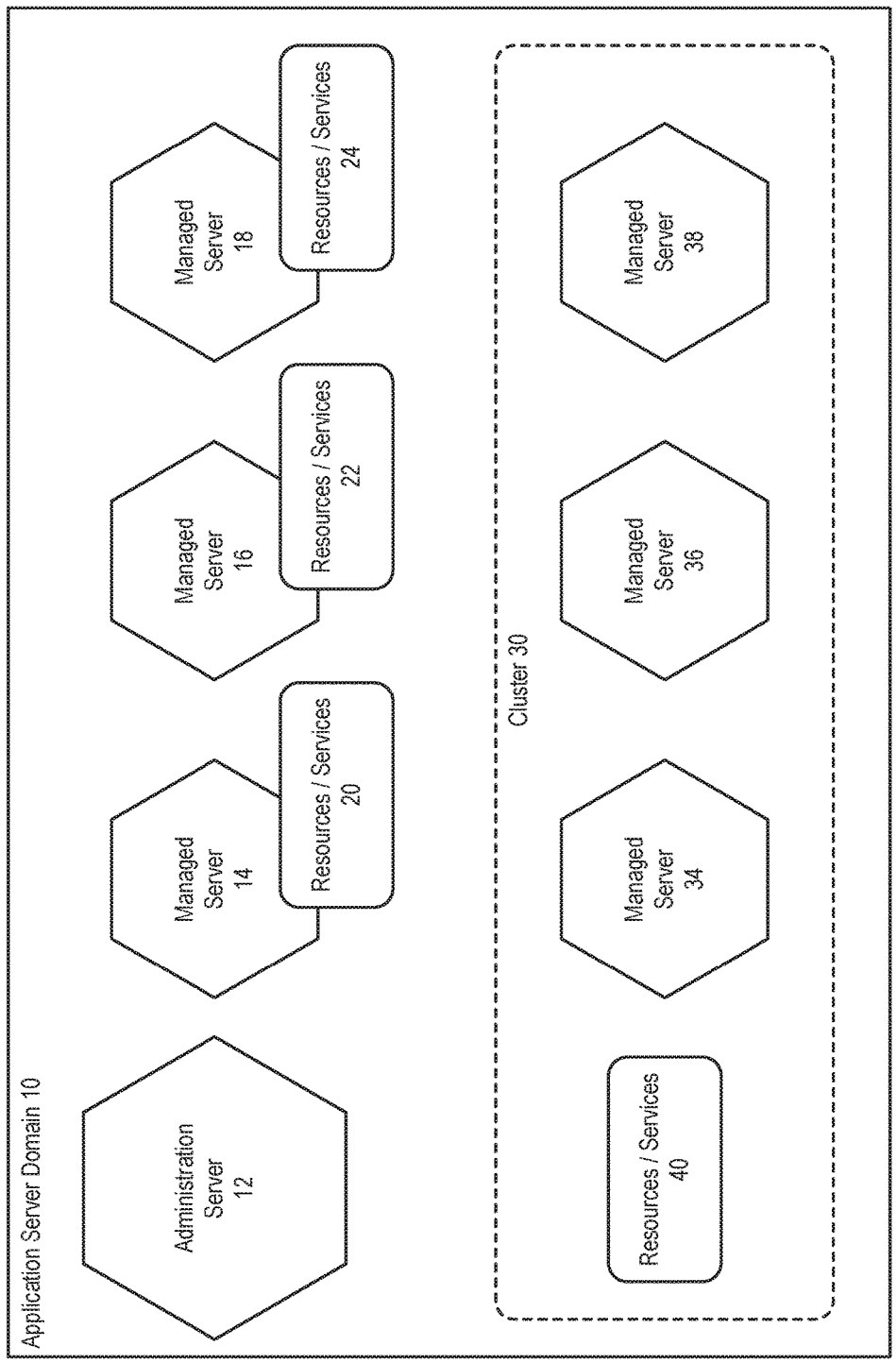
FIG. 1 illustrates a traditional application server domain, including a plurality of application server instances and resources or services.

FIG. 1 illustrates a traditional application server domain, including a plurality of application server instances and resources or services.

As illustrated in FIG. 1, generally, a traditional application server domain 10 includes a special application server instance, referred to as an administration server 12, which operates as a central point by which resources in the domain can be configured and managed. When multiple domains are used, each domain's configuration can be stored in a separate configuration file, which can be stored at the administration server, together with other components such as logs or security files.

When an administration server is used to perform a particular configuration task, for example to perform configuration changes within a domain, those changes will apply only to the domain(s) that are managed by that administration server. To manage the configuration of another domain, the administration server for that other domain can be used.

This allows the various application server instances, software applications, and resources in one domain to be generally independent of any application server instances, software applications, and resources in a different domain.

Typically, an administrator will configure a domain to include additional application server instances, generally referred to as managed server instances (managed servers) 14, 16, 18. The administrator can deploy software applications, for example as Enterprise Java Beans (EJBs), or other resources 20, 22, 24, to the managed servers, and use the administration server for configuration and management of those applications and resources.

In some environments, a plurality of managed servers 34, 36, 38, can be grouped into one or more clusters 30, which enables a sharing of resources 40, and a balancing of loads and failover protection for software applications deployed within that cluster.

In some environments, a domain configuration can also include information describing resources or services associated with the software applications hosted within the domain, for example, security providers, resource adapters, Java Database Connectivity (JDBC) data sources, Java Message Service (JMS) messaging servers, store-and-forward services, persistent stores, startup classes, and/or diagnostics and monitoring services.

Typically, each software application instance deployed to a domain runs within its own dedicated virtual machine, for example a Java Virtual Machine (JVM), which provides a runtime environment, examples of which include the Oracle HotSpot and JRockit JVMs.

Multitasking Virtual Machine

In accordance with an embodiment, a multitasking virtual machine (MVM) is a modification of a JVM that enables safe, secure, and scalable multitasking. Safety is achieved by strict isolation of software applications from one another. Resource control mechanisms augment security by preventing some denial-of service attacks. Scalability is provided through a design principle that includes sharing much of the runtime among applications, and replicating everything else.

In accordance with an embodiment, a multitasking virtual machine can be implemented as described, for example, in "Multitasking without Compromise: a Virtual Machine Evolution", by Grzegorz Czajkowski and Laurent Daynès of Sun Microsystems, OOPSLA 01 Tampa Fla. USA, Copyright ACM 2001; or in U.S. Pat. No. 6,931,638, which claims the benefit of priority to U.S. Provisional Application No. 60/276,409; each of which are herein incorporated by reference.

Figure 2:
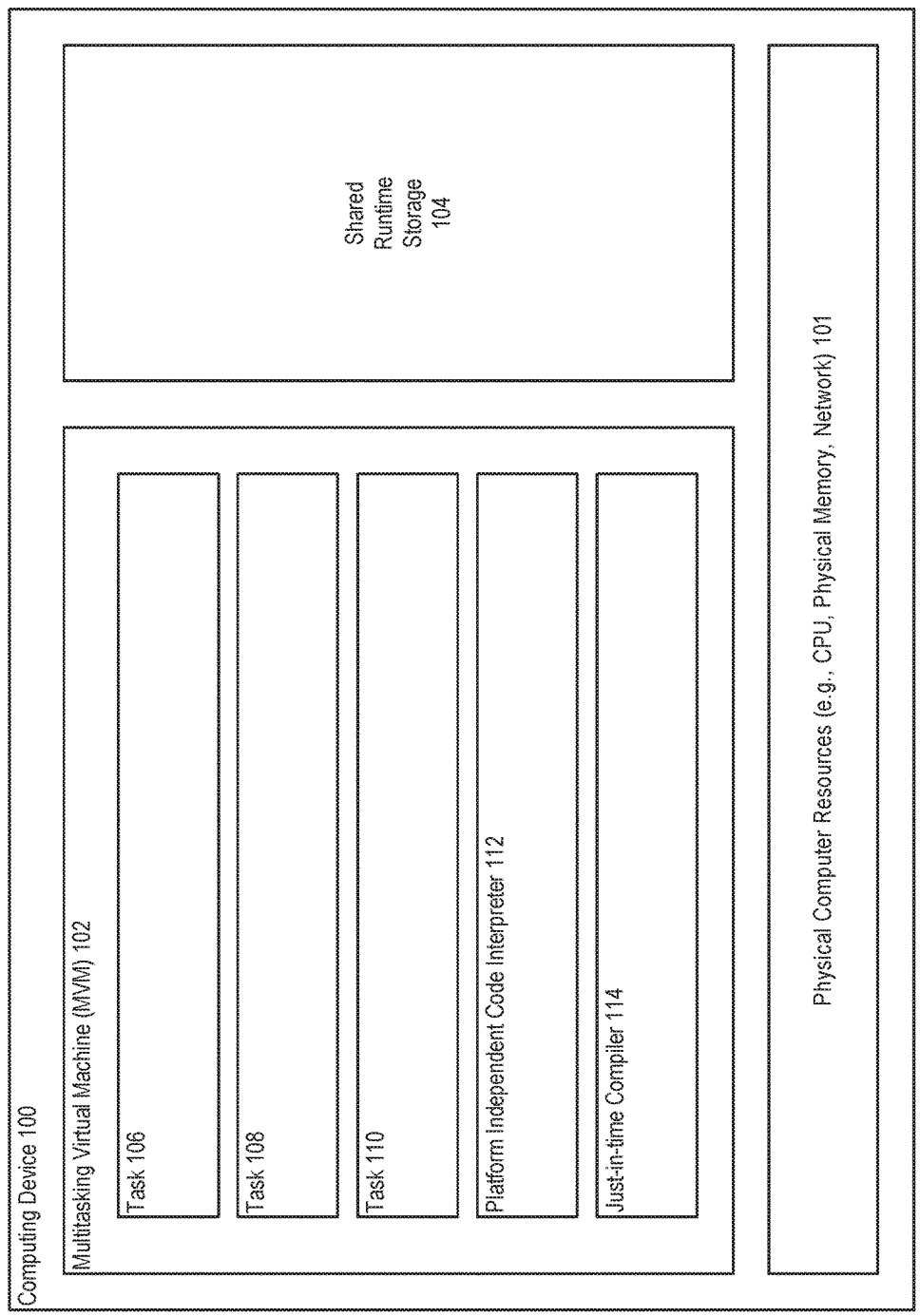
FIG. 2 illustrates an example of a multitasking virtual machine, in accordance with an embodiment.

FIG. 2 illustrates an example of a multitasking virtual machine, in accordance with an embodiment.

As illustrated in FIG. 2, in accordance with an embodiment, a computing device 100, which can generally be any type of computer system, including, but not limited to, a mainframe computer, a personal computer or laptop, a server, a mobile computing device such as a mobile phone or tablet, an appliance, or any other computer system, includes physical computer resources (e.g., one or more CPU/microprocessors, physical memory, network) 101.

A multitasking virtual machine executes platform-independent code on behalf of multiple tasks, such that each task operates as a virtual task, or is otherwise provided with the illusion that it is the only task being executed. For example, multitasking virtual machine 102 can include shared runtime storage 104, tasks 106, 108, and 110, platform-independent code interpreter 112, and dynamic compiler 114. A multitasking virtual machine may include more or less tasks than the amount illustrated.

A shared runtime storage 104 contains the runtime data structures that can be shared among the tasks executed by the multitasking virtual machine. Data structures that make up the shared runtime representation of classes, such as, platform-independent code of class methods, dynamically compiled native code for class methods, and other class information (e.g., in the case of the Java programming language, the constant pool, the field, method, and interface arrays, etc.) are stored in the shared runtime storage.

The tasks (e.g., 106, 108, and 110) maintain data that is private to them, in their respective private storage area. The initialization states of the classes used by a task and their static variables are examples of task-private data.

A platform-independent code interpreter 112 interprets the platform-independent code for tasks (e.g., 106, 108, and 110).

A dynamic compiler 114 serves the requests issued by the runtime of the multitasking virtual machine, to compile a platform-independent code to a native code of the computing device. Converting the platform-independent code to the native code of the computing device can increase the efficiency and throughput of the computing device.

Typically, the dynamic compiler converts the platform-independent code to the native code of the computing device after a threshold number of invocations of the platform-independent code. Since converting the platform-independent code to the native code of the computing device is a costly process in terms of processing time, the use of the dynamic compiler is delayed to ensure that the cost of conversion will be recovered in the faster execution time of the platform-independent code. Conversion to native code, by the dynamic compiler, is performed on a method-by-method basis (i.e., some class methods may be converted to native code by the dynamic compiler, and some may not be converted).

Additional description of an exemplary embodiment of a multitasking virtual machine are provided in U.S. Pat. No. 6,931,638, which is herein incorporated by reference.

Multi-Tenant Application Server Environments

In accordance with an embodiment, a multi-tenant application server environment can be configured to include and operate according to an application server domain configuration, which is used at runtime to define a multi-tenant application server domain.

Figure 3:
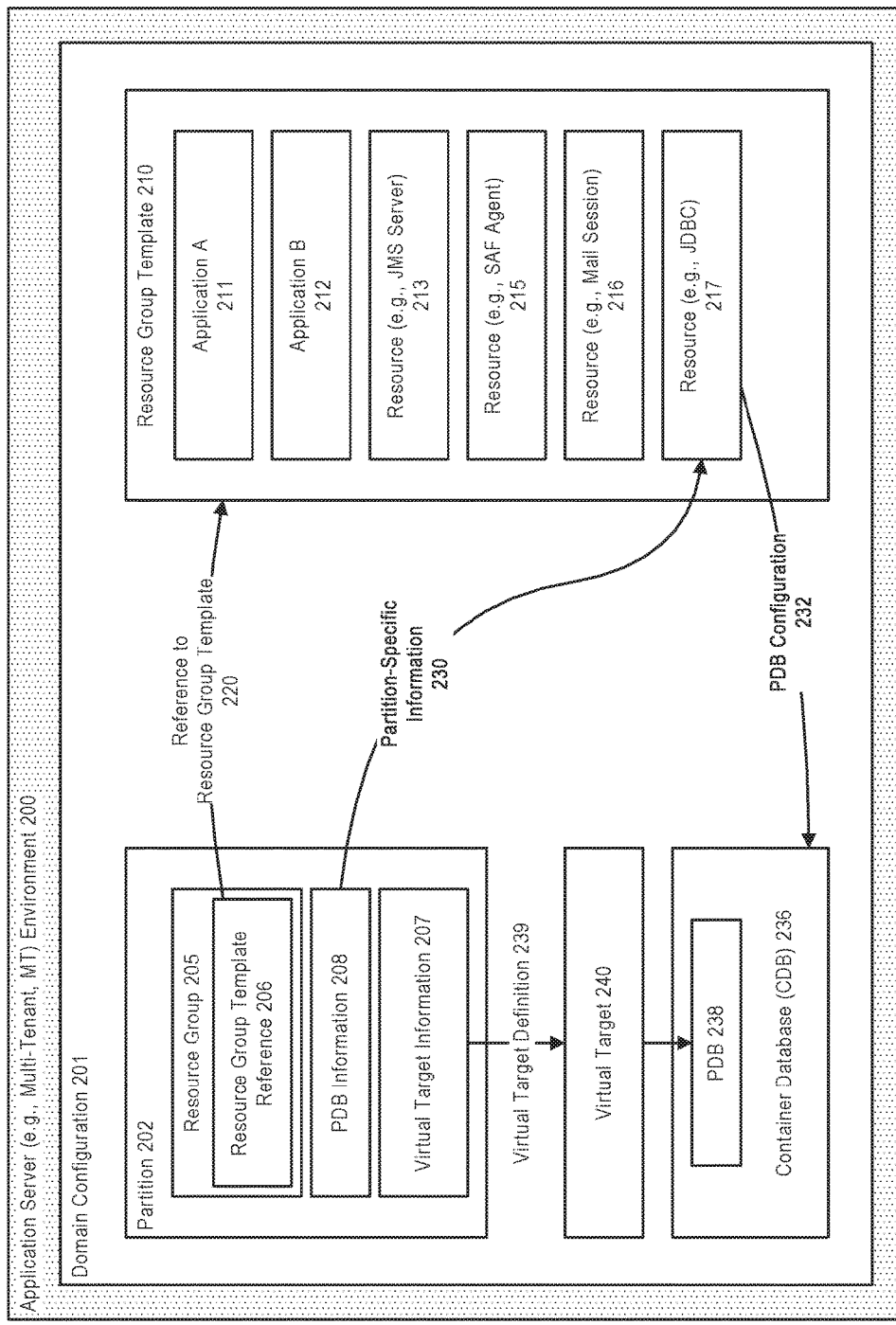
FIG. 3 illustrates an example of a multi-tenant application server environment, in accordance with an embodiment.

FIG. 3 illustrates an example of a multi-tenant application server environment, in accordance with an embodiment.

As illustrated in FIG. 3, in accordance with an embodiment, a multi-tenant application server (e.g., multi-tenant, MT) environment 200, or other computing environment which enables the deployment and execution of software applications, can be configured to include and operate according to a domain configuration 201 that is used at runtime to define an application server domain, and enables the definition of one or more partitions that provide a runtime and administrative subdivision or slice of the domain.

In accordance with an embodiment, each partition can be associated with a globally unique partition identifier (ID) and partition configuration. Optionally, a partition 202 can include, for example, a resource group 205 with reference to a resource group template 206, a virtual target information 207, and a PDB information 208. A resource group template 210 can include, for example, a plurality of application deployments A 211 and B 212, together with deployable resources, such as a JMS server 213, an SAF agent 215, a mail session component 216, and a JDBC system resource 217.

The partition, resource group, and resource group template illustrated is provided merely by way of example, and in accordance with other embodiments, different partition, resource group and/or resource group template elements can be provided.

In accordance with an embodiment, a partition (for example, partition 202), can reference or extend 220 a particular resource group template (for example, resource group template 210). Such referencing enables, for example, a PDB information associated with a particular partition to be used in combination with a referenced resource group template, to indicate a partition-specific information 230 for the partition. The partition-specific PDB information can then be used by the application server to configure resources for use by the partition.

For example, the partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition (e.g., baylandurgentcare.com), which can then be made accessible via a uniform resource locator (URL, e.g., http://baylandurgentcare.com).

Figure 4:
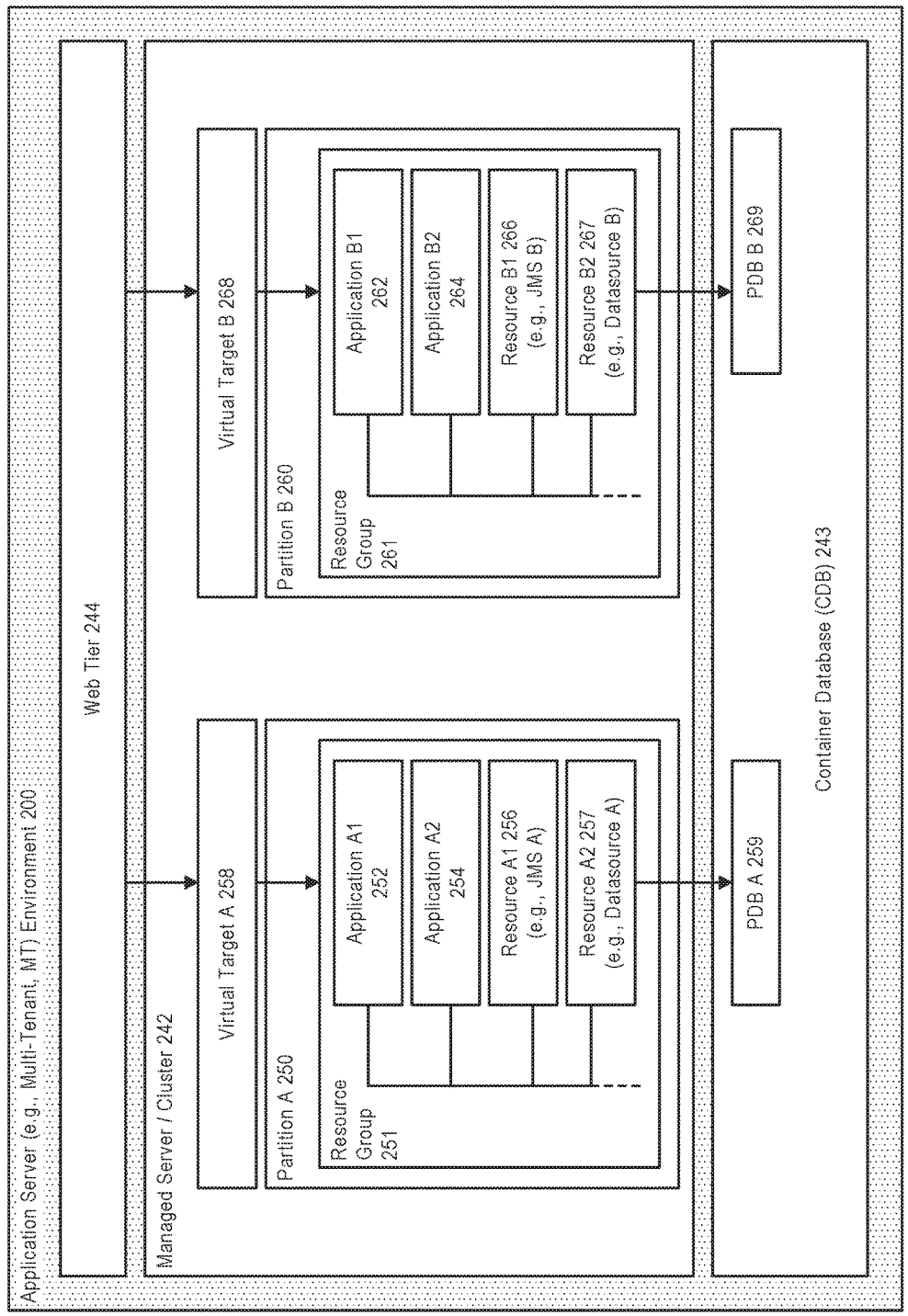
FIG. 4 further illustrates an example of a multi-tenant application server environment, in accordance with an embodiment.

FIG. 4 further illustrates an example of a multi-tenant application server environment, in accordance with an embodiment.

As illustrated in FIG. 4, in accordance with an embodiment, a system configuration such as a config.xml configuration file, can be used to define a partition, including providing configuration elements for resource groups associated with that partition, and/or other partition properties. Values can be specified per-partition, for example using property name/value pairs.

In accordance with an embodiment, a plurality of partitions can be executed within a managed server or cluster 242, or a similar environment which can provide access to a container database 243, and which is accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition.

For example, partition A can be configured to include a resource group 251 which contains an application A1 252, application A2 254, and JMS A 256, together with a datasource A 257 associated with PDB A 259, wherein the partition A is accessible via a virtual target A 258. Similarly, partition B 260 can be configured to include a resource group 261 which contains an application B1 262, application B2 264, and JMS B 266, together with a datasource B 267 associated with PDB B 269, wherein the partition B is accessible via a virtual target B 268.

Additional description of an exemplary embodiment of a multi-tenant application server environment is provided in U.S. Patent Application titled "SYSTEM AND METHOD FOR SUPPORTING MULTI-TENANCY IN AN APPLICATION SERVER, CLOUD, OR OTHER ENVIRONMENT", application Ser. No. 14/601,883, which is herein incorporated by reference.

Resources, Resource Groups, and Resource Group Templates

In accordance with an embodiment, a resource can be a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

In accordance with an embodiment, a resource group is a named, fully-qualified collection of deployable resources that can be defined either at a domain or partition level. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, a resource group template is a collection of deployable resources that are defined at a domain level, that can be referenced from a resource group. Some of the information required to activate its resources may not be stored as part of the template itself, such that it supports the specification of partition-level configuration. A domain can contain a number of resource group templates, each of which can include, for example, one or more related Java applications and the resources on which those applications depend. Some of the information about such resources may be the same across all partitions, while other information may vary from one partition to the next. Not all configuration need be specified at the domain level—partition-level configuration can be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template, and a partition can have multiple resource groups. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, each partition can be associated with a means of access called a virtual target. For example, partitions for Tenant_A and Tenant_B, can be accessed using URIs /Tenant_A and /Tenant_B respectively, so that the corresponding URLs appear as host:port/tenant_aRapplication context> and host:port/tenant_b/<application context>. Virtual targets also support the use of host or virtual host, which enables accessing a Tenant_A partition using tenant_a.com, and a Tenant_B partition using tenant_b.com.

Tenants

In accordance with an embodiment, in a multi-tenant application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to, from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant, refer only to resources associated with that tenant, and not to resources associated with other tenants.

Multi-Tenant Application Server with MVM Environments

In accordance with an embodiment, a multi-tenant application server can be used with a multitasking virtual machine; wherein the multi-tenant application server enables the definition of one or more partitions that provide a runtime and administrative subdivision or slice of an application server domain; while the multitasking virtual machine enables safe, secure, and scalable multitasking of software applications.

Figure 5:
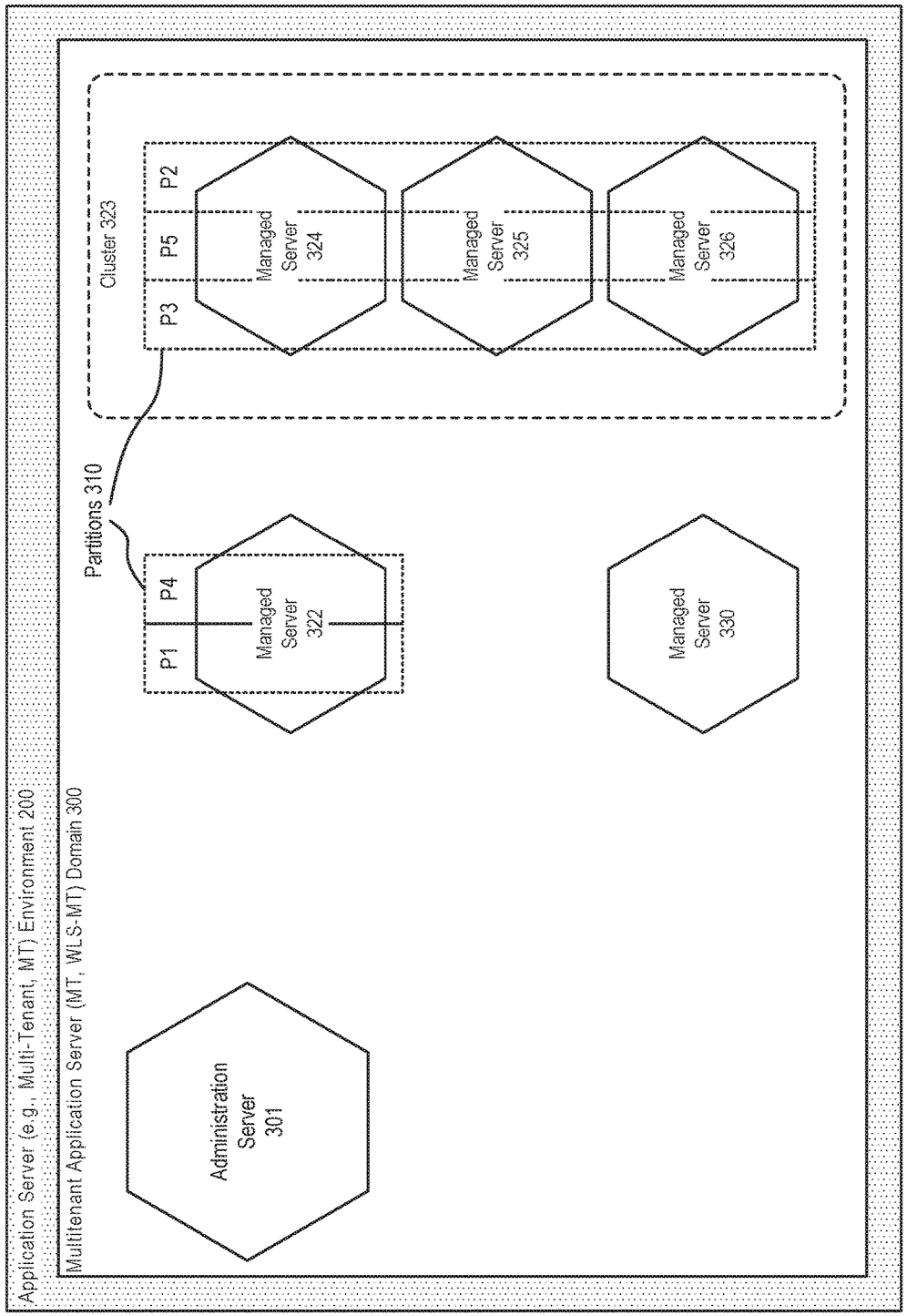
FIG. 5 illustrates an example use of a multi-tenant application server with one or more managed server instances, or managed server clusters, in accordance with various embodiments.

FIG. 5 illustrates an example use of a multi-tenant application server with one or more managed server instances, or managed server clusters, in accordance with various embodiments.

As illustrated in FIG. 5 (which, for simplicity of illustration, does not show resources or services), in accordance with an embodiment, there is one administration server 301 for the application server domain 300, and one or more managed servers that support partitions 310.

For example, managed server 322 includes partitions P1 and P4; while cluster 323 includes managed servers, 324, 325, and 326, which in turn are partitioned into P3, P5, and P2 partitions. Other managed servers 330 may not be partitioned.

Unlike the example described above with regard to FIG. 1, in which each domain may have its own separate tenant; as shown in FIG. 5, in accordance with some embodiments, each of the partitions may have different tenants.

For example, partition P1 and P2 can belong to Tenant_A; while partition P3, P4, and P5 can belong to Tenant_B. In this example, the administration server (301) serves both Tenant_A and Tenant_B.

In accordance with other embodiments there can also be separate domains, which may, or may not, be partitioned depending on a particular need.

In accordance with an embodiment, the application server can further include one or more partitions that are defined for use at runtime. As described above, each partition can be associated with a partition identifier and configuration, and can further include one or more resource groups together with a reference to a resource group template, and/or other partition-specific applications or resources.

Figure 6:
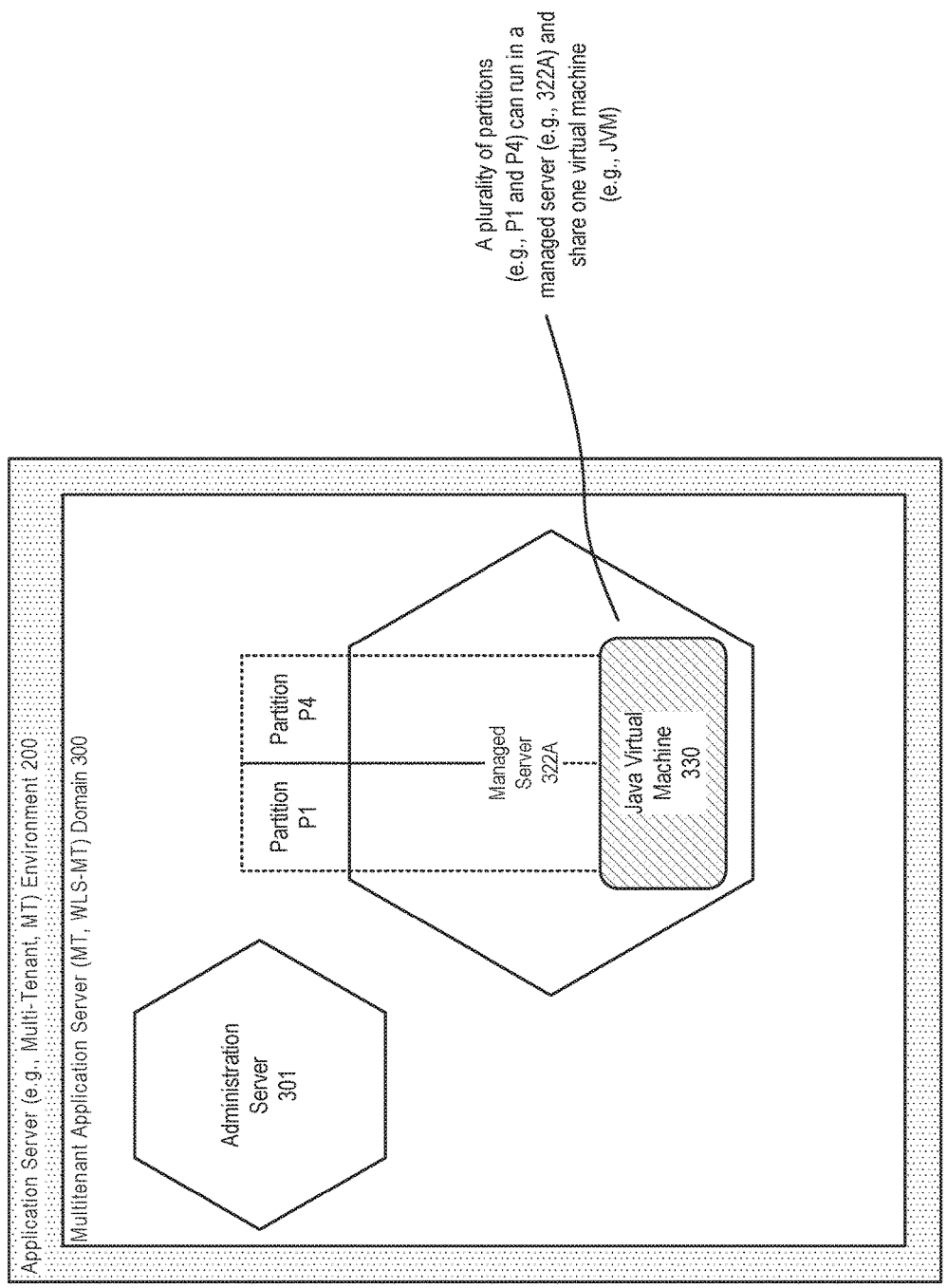
FIG. 6 illustrates the use of a multi-tenant application server environment with a JVM, in accordance with an embodiment.

FIG. 6 illustrates the use of a multi-tenant application server environment with a JVM, in accordance with an embodiment.

As illustrated in FIG. 6, in accordance with an embodiment, the managed server 322 that is shown and described above with regard to FIG. 5, is illustrated in further detail, here as managed server 322A.

In accordance with an embodiment, a plurality of partitions, P1 and P4, can run in managed server 322A, and share one virtual machine, such as a Java virtual machine (JVM) 330.

Figure 7:
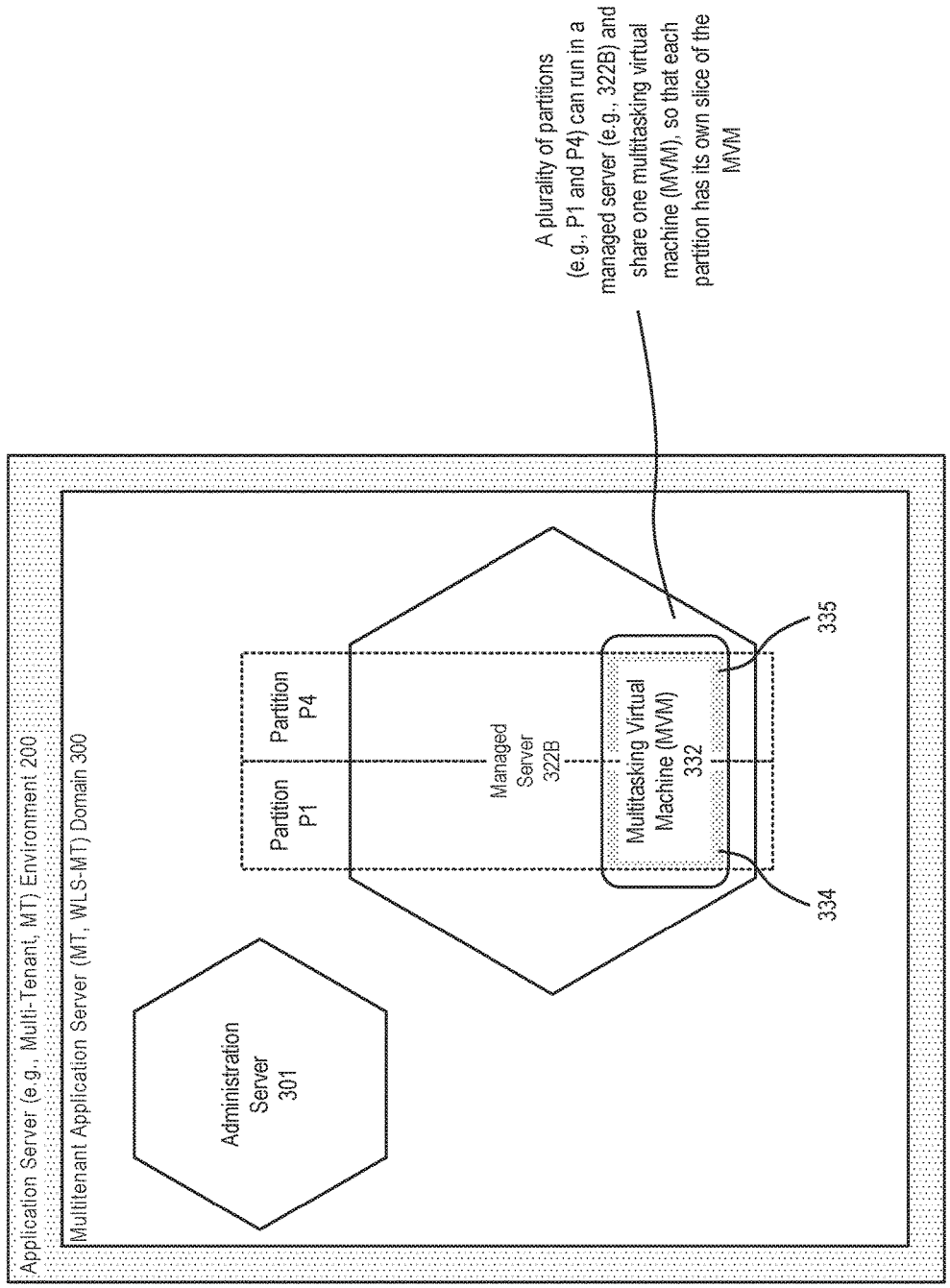
FIG. 7 illustrates the use of a multi-tenant application server environment with a multi-tasking virtual machine, in accordance with an embodiment.

FIG. 7 illustrates the use of a multi-tenant application server environment with a multi-tasking virtual machine, in accordance with an embodiment.

As illustrated in FIG. 7, in accordance with an alternative embodiment, the managed server 322 that is shown and described above with regard to FIG. 5, is illustrated in further detail, here as managed server 322B.

In accordance with this alternative embodiment, a plurality of partitions, P1 and P4, can run within managed server 322B, and share one multi-tasking virtual machine 332, such as that illustrated and described above with regard to FIG. 2.

In accordance with an embodiment, each managed server utilizes a single thread pool, which avoids the need for a separate thread pool for each partition and/or application on a managed server. The thread pool can be self-tuning, and capable of adjusting the number of threads in the pool, to optimize the overall throughput of the managed server. A thread pool defined at the server level can be split across partitions, and further between applications in the partition.

In accordance with an embodiment, work managers can be configured to allow prioritizing of work. At runtime, the application server uses these as guidelines to assign pending work and queued requests to execution threads in the single thread pool.

Each work manager can be configured with a relative priority of workload, and can also be configured with a minimum threads constraint to ensure that a thread is always available for processing work requests to avoid deadlock. A work manager can also be configured with a maximum threads constraint to limit the number of concurrent threads executing requests that are scoped to a partition, or scoped to a domain.

This ensures fairness in thread resource usages among partitions, and prevents thread resource starvation for a partition.

As illustrated in FIG. 7, in accordance with an embodiment, the plurality of partitions P1 and P4 running in managed server 322B can share the multi-tasking virtual machine including, for example, that a first partition (P1) is associated with or otherwise uses a first task (e.g., task 106) of the multi-tasking virtual machine, and a second partition (P4) is associated with or otherwise uses a second task (e.g., task 108) of the multi-tasking virtual machine, which effectively provides that each partition has or is otherwise associated with its own subdivision or slice 334, 335 of the multitasking virtual machine.

Figure 8:
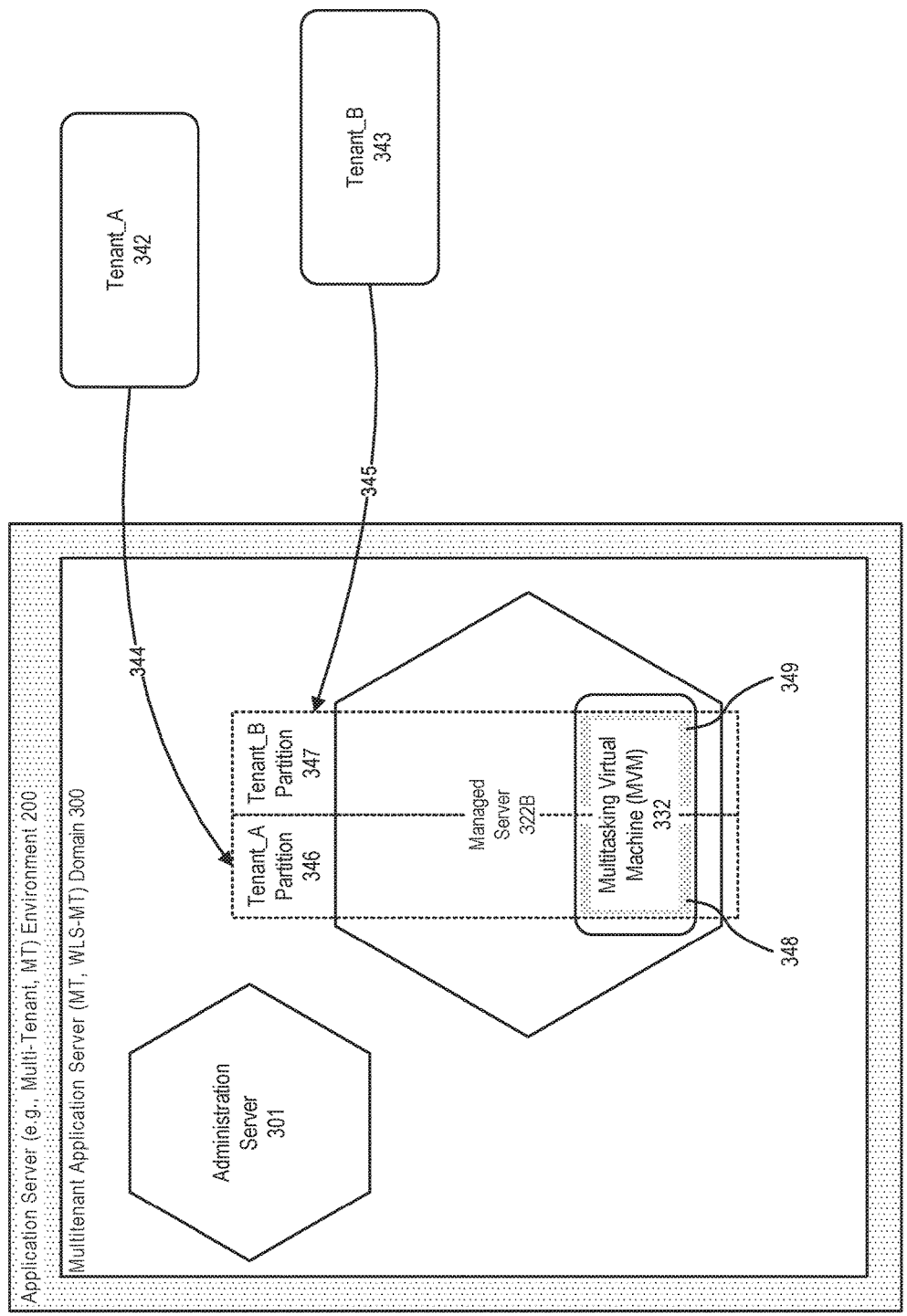
FIG. 8 illustrates the use of a multi-tenant application server environment with a multi-tasking virtual machine, and a plurality of tenants, in accordance with an embodiment.

FIG. 8 illustrates the use of a multi-tenant application server environment with a multi-tasking virtual machine, and a plurality of tenants, in accordance with an embodiment.

As illustrated in FIG. 8, in accordance with an embodiment, each of a plurality of tenants, for example Tenant A_342 and Tenant_B 343, can be associated 344, 345, with a particular partition, for use by that tenant.

In the illustrated example, Tenant_A can be associated with a Tenant_A Partition 346, while Tenant_B can be associated with a Tenant_B Partition 347, which effectively provides that each partition, and tenant thereof, has or is otherwise associated with its own subdivision or slice 348, 349 of the multitasking virtual machine.

Figure 9:
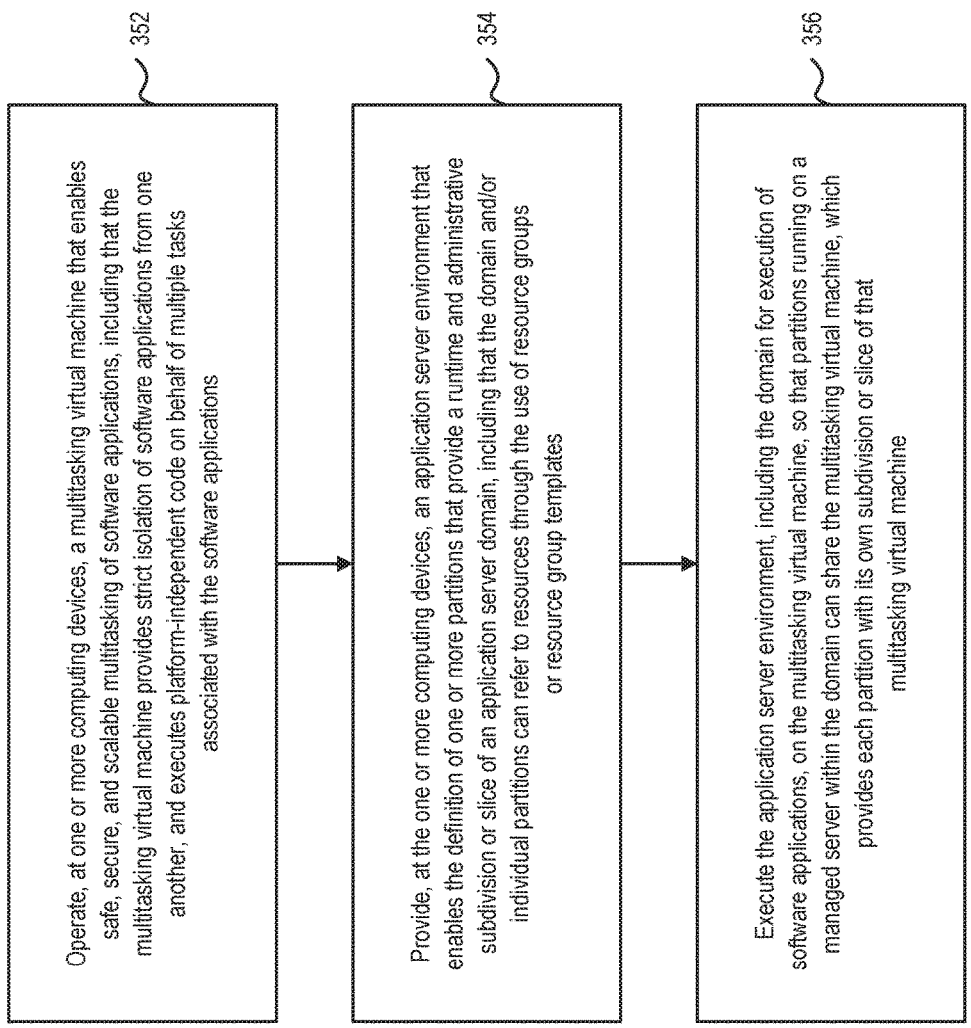
FIG. 9 illustrates a process of using a multi-tenant application server environment with a multi-tasking virtual machine, in accordance with an embodiment.

FIG. 9 illustrates a process of using a multi-tenant application server environment with a multi-tasking virtual machine, in accordance with an embodiment.

As illustrated in FIG. 9, at step 352, at one or more computing devices, a multitasking virtual machine is operated that enables safe, secure, and scalable multitasking of software applications, including that the multitasking virtual machine provides strict isolation of software applications from one another, and executes platform-independent code on behalf of multiple tasks associated with the software applications.

At step 354, at the one or more computing devices, an application server environment is provided that enables the definition of one or more partitions that provide a runtime and administrative subdivision or slice of an application server domain, including that the domain and/or individual partitions can refer to resources through the use of resource groups or resource group templates.

At step 356, the application server environment, including the domain for execution of software applications, is executed on the multitasking virtual machine, so that partitions running on a managed server within the domain can share the multitasking virtual machine, which provides each partition with its own subdivision or slice of that multitasking virtual machine.

Figure 10:
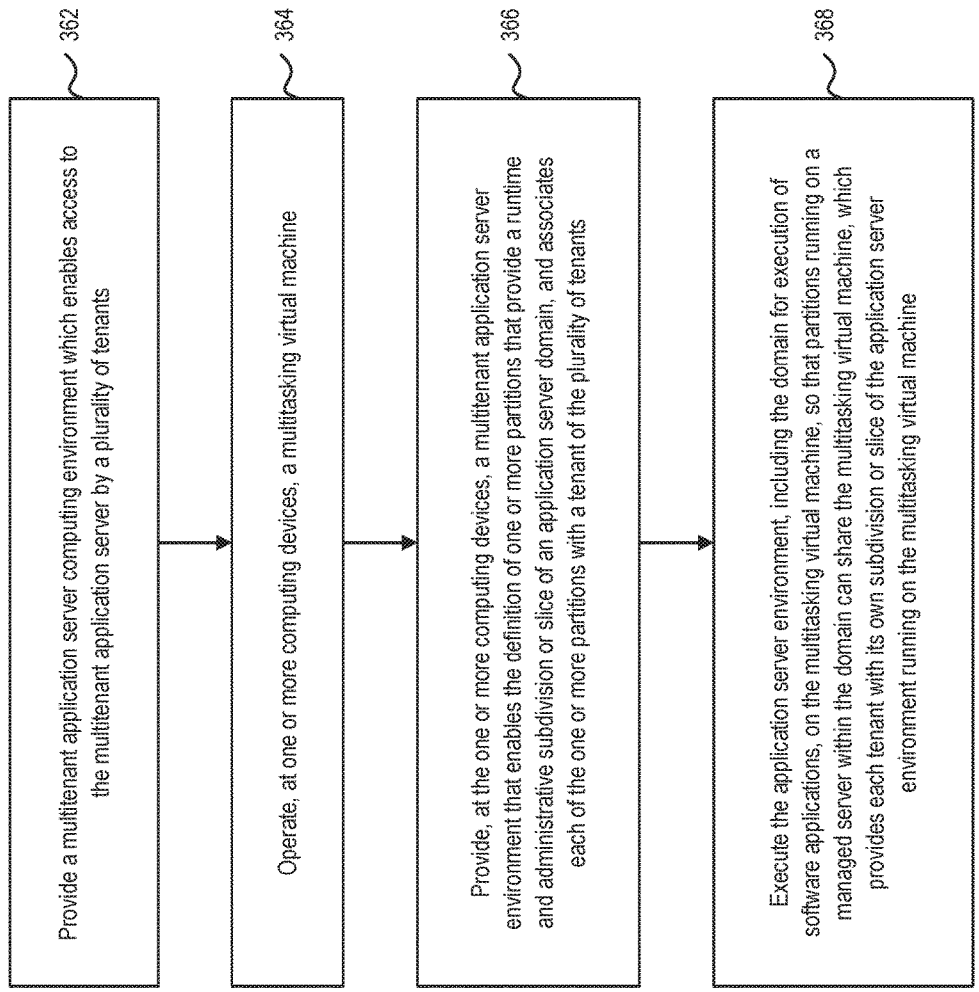
FIG. 10 illustrates a process of using a multi-tenant application server environment with a multi-tasking virtual machine, and a plurality of tenants, in accordance with an embodiment.

FIG. 10 illustrates a process of using a multi-tenant application server environment with a multi-tasking virtual machine, and a plurality of tenants, in accordance with an embodiment.

As illustrated in FIG. 10, at step 362, a multitenant application server computing environment is provided which enables access to the multitenant application server by a plurality of tenants.

At step 364, at one or more computing devices, a multitasking virtual machine is operated.

At step 366, at the one or more computing devices, a multitenant application server environment is provided that enables the definition of one or more partitions that provide a runtime and administrative subdivision or slice of an application server domain, and associates each of the one or more partitions with a tenant of the plurality of tenants.

At step 368, the application server environment, including the domain for execution of software applications, is executed on the multitasking virtual machine, so that partitions running on a managed server within the domain can share the multitasking virtual machine, which provides each tenant with its own subdivision or slice of the application server environment running on the multitasking virtual machine.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

For example, although for purposes of illustration many of the embodiments described above describe the use of multi-tenancy in WebLogic Server (WLS) multi-tenant WLS (WLS-MT) environments, similar functionality and features can be used with other application server, enterprise application, cloud, or other environments.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for use of a multi-tenant application server environment with a multitasking virtual machine, comprising:
   one or more computers, each of the one or more computers including a processor, and a plurality of managed servers operating thereon as part of an application server environment;
   wherein each managed server, of the plurality of managed servers, includes a multitasking virtual machine that enables multitasking of software applications, including that the multitasking virtual machine maintains a shared runtime representation of classes shared among tasks executed by the multitasking virtual machine, and a task-private data for each particular task;
   wherein the application server environment that executes on, and is associated with, the plurality of managed servers and their multitasking virtual machines, enables deployment and execution of software applications, including a configuration that is used at runtime to define an application server domain together with a plurality of partitions;
   wherein each partition of the plurality of partitions provides an administrative and runtime subdivision of the application server domain and can include one or more of the software applications or refer to domain-wide resources associated with resource groups; and
   wherein the system enables each partition, of the plurality of partitions, to share a particular one or more of the managed servers, including the multitasking virtual machines at the one or more managed servers, which provides that each partition has or is otherwise associated with a subdivision of the multitasking virtual machines at the one or more managed servers that are running the partition, for use by the partition.

2. The system of claim 1, wherein, at each of the one or more managed servers running two or more partitions, each partition of the two or more partitions executes as a task within the multi-tasking virtual machine at that managed server, including that a first partition is associated with or otherwise uses a first task of the multi-tasking virtual machine, and a second partition is associated with or otherwise uses a second task of the multi-tasking virtual machine.

3. The system of claim 2, wherein, at each of the one or more managed servers, the multi-tasking virtual machines provides that each of the plurality of tasks, that are associated with different partitions running on the one or more managed servers, maintains data that is private to that task and its associated partition in a respective private storage area of the multi-tasking virtual machine.

4. The system of claim 1, wherein each partition providing an administrative and runtime subdivision of the application server domain is associated with a partition identifier and configuration, and can contain applications and/or refer to domain-wide resources through the use of resource groups and/or resource group templates; wherein a resource group is a named, fully-qualified collection of deployable resources that can be defined either at a domain or partition level.

5. The system of claim 1, wherein the application server environment enables association of one or more partitions with a tenant of a cloud environment, for use by the tenant.

6. The system of claim 1, wherein each partition is associated with a partition identifier and a partition configuration, and includes a resource group that is a collection of deployable applications or resources defined at domain or partition level and associated with a virtual target information that defines a target to which the particular resource group is deployed.

7. The system of claim 1, wherein the plurality of managed servers are grouped into one or more clusters of managed servers that enables a sharing of resources and balancing of loads and failover protection for software applications deployed within that cluster.

8. The system of claim 7, wherein each of the plurality of managed servers and clusters can be associated with sets of partitions, each of which set of partitions executes on and shares the multitasking virtual machines associated with that set of partitions.

9. The method of claim 7, wherein each of the plurality of managed servers and clusters can be associated with sets of partitions, each of which set of partitions executes on and shares the multitasking virtual machines associated with that set of partitions.

10. A method for use of a multi-tenant application server environment with a multitasking virtual machine, comprising:
    providing, at one or more computers, a plurality of managed servers operating thereon as part of an application server environment;
    wherein each managed server, of the plurality of managed servers, includes a multitasking virtual machine that enables multitasking of software applications, including that the multitasking virtual machine maintains a shared runtime representation of classes shared among tasks executed by the multitasking virtual machine, and a task-private data for each particular task;
    wherein the application server environment that executes on, and is associated with, the plurality of managed servers and their multitasking virtual machines, enables deployment and execution of software applications, including a configuration that is used at runtime to define an application server domain together with a plurality of partitions;

wherein each partition of the plurality of partitions provides an administrative and runtime subdivision of the application server domain and can include one or more of the software applications or refer to domain-wide resources associated with resource groups; and wherein each partition, of the plurality of partitions, shares a particular one or more of the managed servers, including the multitasking virtual machines at the one or more managed servers, which provides that each partition has or is otherwise associated with a subdivision of the multitasking virtual machines at the one or more managed servers that are running the partition, for use by the partition.

11. The method of claim 10, wherein, at each of the one or more managed servers running two or more partitions, each partition of the two or more partitions executes as a task within the multi-tasking virtual machine at that managed server, including that a first partition is associated with or otherwise uses a first task of the multi-tasking virtual machine, and a second partition is associated with or otherwise uses a second task of the multi-tasking virtual machine.

12. The method of claim 11, wherein, at each of the one or more managed servers, the multi-tasking virtual machines provides that each of the plurality of tasks, that are associated with different partitions running on the one or more managed servers, maintains data that is private to that task and its associated partition in a respective private storage area of the multi-tasking virtual machine.

13. The method of claim 10, wherein each partition providing an administrative and runtime subdivision of the application server domain is associated with a partition identifier and configuration, and can contain applications and/or refer to domain-wide resources through the use of resource groups and/or resource group templates; wherein a resource group is a named, fully-qualified collection of deployable resources that can be defined either at a domain or partition level.

14. The method of claim 13, wherein the application server environment enables association of one or more partitions with a tenant of a cloud environment, for use by the tenant.

15. The method of claim 13, wherein each partition is associated with a partition identifier and a partition configuration, and includes a resource group that is a collection of deployable applications or resources defined at domain or partition level and associated with a virtual target information that defines a target to which the particular resource group is deployed.

16. The method of claim 10, wherein the plurality of managed servers are grouped into one or more clusters of managed servers that enables a sharing of resources and balancing of loads and failover protection for software applications deployed within that cluster.

17. A non-transitory computer readable storage medium, including instructions stored thereon which when read and executed by one or more computers cause the one or more computers to perform the steps comprising:

providing, at one or more computers, a plurality of managed servers operating thereon as part of an application server environment;

wherein each managed server, of the plurality of managed servers, includes a multitasking virtual machine that enables multitasking of software applications, including that the multitasking virtual machine maintains a shared runtime representation of classes shared among tasks executed by the multitasking virtual machine, and a task-private data for each particular task;

wherein the application server environment that executes on, and is associated with, the plurality of managed servers and their multitasking virtual machines, enables deployment and execution of software applications, including a configuration that is used at runtime to define an application server domain together with a plurality of partitions;

wherein each partition of the plurality of partitions provides an administrative and runtime subdivision of the application server domain and can include one or more of the software applications or refer to domain-wide resources associated with resource groups; and wherein each partition, of the plurality of partitions, shares a particular one or more of the managed servers, including the multitasking virtual machines at the one or more managed servers, which provides that each partition has or is otherwise associated with a subdivision of the multitasking virtual machines at the one or more managed servers that are running the partition, for use by the partition.

18. The non-transitory computer readable storage medium of claim 17, wherein, at each of the one or more managed servers running two or more partitions, each partition of the two or more partitions executes as a task within the multitasking virtual machine at that managed server, including that a first partition is associated with or otherwise uses a first task of the multi-tasking virtual machine, and a second partition is associated with or otherwise uses a second task of the multi-tasking virtual machine.

19. The non-transitory computer readable storage medium of claim 18, wherein, at each of the one or more managed servers, the multi-tasking virtual machines provides that each of the plurality of tasks, that are associated with different partitions running on the one or more managed servers, maintains data that is private to that task and its associated partition in a respective private storage area of the multi-tasking virtual machine.

20. The non-transitory computer readable storage medium of claim 17, wherein each partition providing an administrative and runtime subdivision of the application server domain is associated with a partition identifier and configuration, and can contain applications and/or refer to domain-wide resources through the use of resource groups and/or resource group templates; wherein a resource group is a named, fully-qualified collection of deployable resources that can be defined either at a domain or partition level.

21. The non-transitory computer readable storage medium of claim 17, wherein the application server environment enables association of one or more partitions with a tenant of a cloud environment, for use by the tenant.

* * * * *

UNITED STATES PATENT AND TRADEMARK OFFICE
CERTIFICATE OF CORRECTION

PATENT NO. : 10,635,491 B2
APPLICATION NO. : 15/146312
DATED : April 28, 2020
INVENTOR(S) : Islam et al.

Page 1 of 1

It is certified that error appears in the above-identified patent and that said Letters Patent is hereby corrected as shown below:

In Column 7, Line 63, delete "aRapplication" and insert -- a/<application --, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*